United States Patent [19]

Bunel et al.

[11] Patent Number: 5,267,438
[45] Date of Patent: Dec. 7, 1993

[54] THRUST REVERSER FOR A TURBOFAN ENGINE

[75] Inventors: Serge P. Bunel, Le Havre; Claude A. G. Dubois, Saint Pair, both of France

[73] Assignee: Societe Hispano-Suiza, Saint Cloud Cedex, France

[21] Appl. No.: 977,187

[22] Filed: Nov. 16, 1992

[30] Foreign Application Priority Data

Nov. 15, 1991 [FR] France .................. 91 14069

[51] Int. Cl.⁵ .................................. F02K 3/02
[52] U.S. Cl. ............................. 60/226.2; 244/110 B; 239/265.29; 239/265.33
[58] Field of Search .............. 60/226.2, 230; 239/265.19, 265.29, 265.31, 265.33; 244/110 B

[56] References Cited

U.S. PATENT DOCUMENTS

| | | | |
|---|---|---|---|
| 3,600,894 | 8/1971 | McClain | 60/226.2 |
| 4,858,430 | 8/1989 | Belbouche | 60/226.2 |
| 4,894,985 | 1/1990 | Dubois et al. | 60/226.2 |
| 4,914,905 | 4/1990 | Dubois et al. | 60/226.2 |
| 4,916,895 | 4/1990 | Dubois | 60/226.2 |
| 4,960,243 | 10/1990 | Dubois et al. | 239/265.29 |
| 4,976,466 | 12/1990 | Vauchel | 239/265.29 |
| 5,039,171 | 8/1991 | Lore | 239/265.29 |
| 5,090,197 | 2/1992 | Dubois | 60/226.2 |

FOREIGN PATENT DOCUMENTS 1227782 10/1966 Fed. Rep. of Germany ............ 239/265.29

Primary Examiner—Richard A. Bertsch
Assistant Examiner—W. J. Wicker
Attorney, Agent, or Firm—Bacon & Thomas

[57] ABSTRACT

A thrust reverser for a turbofan engine is disclosed in which the pressure of the gases passing through the cold flow air duct act on a downstream segment of the thrust reverser door so that the door is normally biased toward its closed, forward thrust position. This positively eliminates any possibility of the thrust reverser door inadvertently opening into its reverse thrust position. The thrust reverser according to the present invention is thus self-closing regardless of the position and/or functioning of the typical closing and locking mechanisms. The thrust reverser door assembly has internal and external doors separately pivotally attached to the turbofan housing so as to each be movable between closed, forward thrust positions, and opened, reverse thrust positions. A single actuating mechanism may be utilized to move both of the internal and external doors between their respective closed and opened positions.

8 Claims, 4 Drawing Sheets

THRUST REVERSER FOR A TURBOFAN ENGINE

BACKGROUND OF THE INVENTION

The present invention relates to a thrust reverser for a turbofan engine, more particularly such a thrust reverser having an inherent safety feature to prevent inadvertent opening of the thrust reverser door.

Turbofan engines are well known in the art and typically comprise a turbojet engine drivingly connected to a turbofan, usually mounted on the front of the turbojet engine. A turbofan housing, radially displaced from, but generally concentric with respect to the turbojet engine housing defines a cold flow air duct for air driven by the turbofan. In such a turbofan engine having a relatively high bypass ratio, thrust reversers are typically provided on the turbofan housing so as to redirect the air passing through the cold flow air duct during landing of the aircraft in order to provide a reverse thrust.

Thrust reversers may assume many different types, but a typical thrust reverser is illustrated in FIG. 1. The thrust reverser comprises a stationary, upstream portion 1 which forms a part of the turbofan housing, a movable portion 2 which redirects the air passing through the cold flow air duct and a stationary, downstream collar 3 which also forms a downstream portion of the turbofan housing. The stationary, upstream portion 1 typically comprises an exterior panel 4 which defines a portion of the exterior surface of the turbofan housing, an interior panel 5 which, in conjunction with the housing for the turbojet engine (not shown) defines the boundaries of the cold flow air duct and a frame 6 which interconnects panels 4 and 5. The frame 6 also supports an actuator 7a for controlling the movement of the movable portion 2, which in this instance comprises one or more movable thrust reversing doors 7. The number of such doors may vary depending upon the application of the turbofan engine to a particular type of aircraft and typically comprises 2, 3 or 4 such thrust reverser doors. These doors may be displaced around the circumference of the turbofan housing and, when in their deployed positions redirect the air passing through the cold flow air duct to provide the thrust reversing effect.

FIG. 2 illustrates a pair of such thrust reversing doors 7 in their deployed positions in which the forward, or upstream, edges are displaced radially outwardly from the generally annular turbofan housing. As is well known in the art, rear, or downstream, portions of the thrust reverser doors 7 extend inwardly into the cold flow duct so as to redirect the air outwardly through the turbofan housing and in a forward direction. Each such thrust reverser door 7 is operatively associated with a hydraulic jack or actuator 7a, which typically comprises a cylinder having an extendible and retractable piston rod attached to the thrust reverser door 7.

Such thrust reversers are well known in the art and typical examples of which may be found in U.S. Pat. Nos. 4,894,985; 4,858,430; 4,916,895; 4,914,905; 4,976,466; 4,960,243; and 5,039,171.

These types of thrust reverser doors have proven very effective in providing thrust reversing forces to the air frame with which the turbofan engine is associated. However, serious problems may arise if the thrust reverser doors are deployed at an inappropriate time. Accidental initiation of thrust reversal can cause catastrophic results to the aircraft and a number of devices are known to preclude such accidental deployment of the thrust reverser doors. In particular, a mechanical locking device on the thrust reverser door and the support structure are known, as well as a mechanical locking device on the thrust reverser control actuator. In some applications, however, such dual safety devices may be inadequate to preclude all risk of malfunctions, especially when the thrust reverser doors are strongly urged to move to their deployed, reverse thrust positions by normal forces acting on the doors.

SUMMARY OF THE INVENTION

A thrust reverser for a turbofan engine is disclosed in which the pressure of the gases passing through the cold flow air duct act on a downstream segment of the thrust reverser door so that the door is normally biased toward its closed, forward thrust position. This positively eliminates any possibility of the thrust reverser door inadvertently opening into its reverse thrust position. The thrust reverser according to the present invention is thus self-closing regardless of the position and/or functioning of the typical closing and locking mechanisms.

The thrust reverser door assembly has internal and external doors separately pivotally attached to the turbofan housing so as to each be movable between closed, forward thrust positions, and opened, reverse thrust positions. A single actuating mechanism may be utilized to move both of the internal and external doors between their respective closed and opened positions.

The external thrust reverser door also defines a downstream edge of the turbofan housing, thereby eliminating the downstream collar portion of the known thrust reversers. The present thrust reverser structure minimizes weight and bulk, and reduces the cost of manufacture, while achieving the required engine performance. The thrust reverser also minimizes aerodynamic losses in both the forward thrust and reverse thrust modes.

A stationary member extends across the reverse thrust opening defined by the turbofan housing and is covered by the thrust reverser doors in their closed, forward thrust positions. The stationary member supports a midportion of the external door and allows the internal door to be sealed, thereby preventing the pressurized gases in the cold flow air duct from acting on an upstream portion of the external thrust reverser door. Since the pressurized gases act only on the portion of the external door located downstream of its pivot axis, such forces keep the external door in the closed, forward thrust position.

An upstream portion of the external door has a surface which may be shaped or contoured so as to impart a desired direction to the reverse thrust gases passing through the reverse thrust opening.

DETAILED DESCRIPTION OF THE PREFERRED EMBODIMENT

Figure 1:
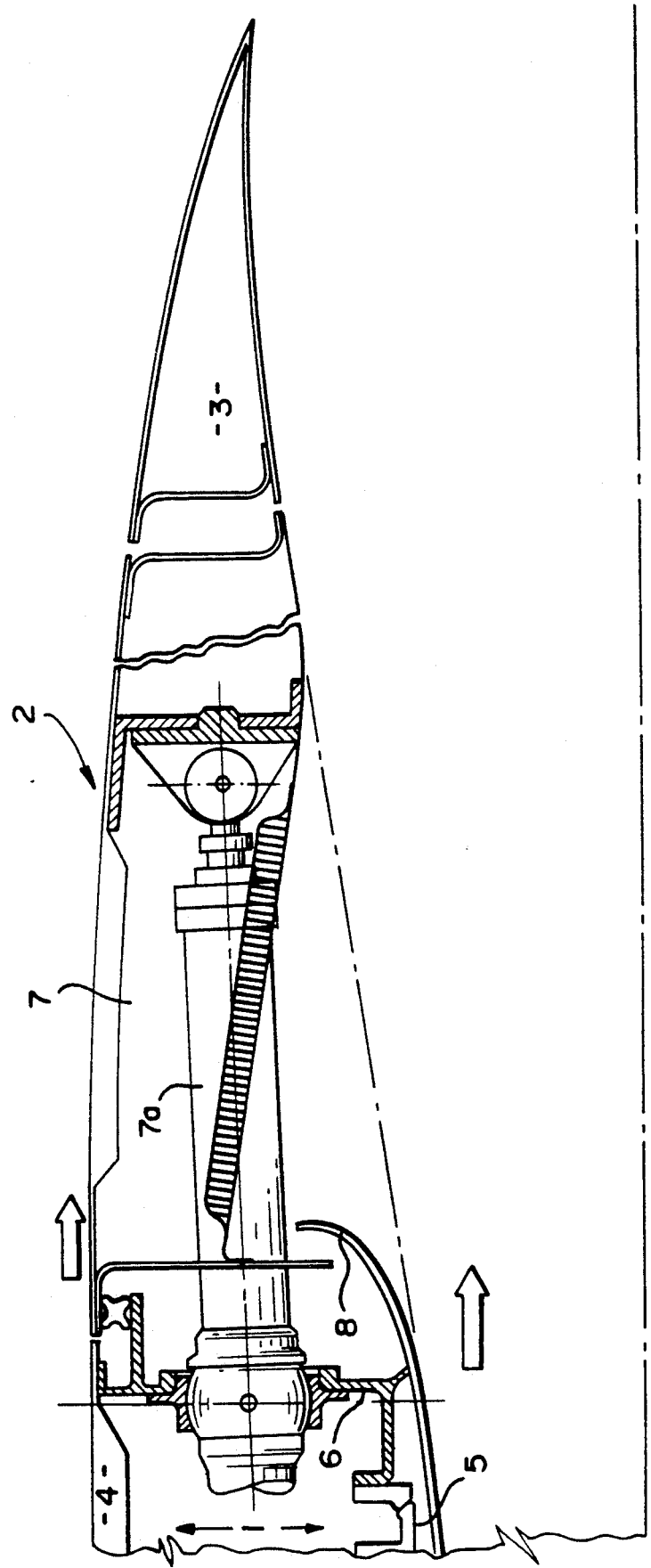
FIG. 1 is a partial, longitudinal, cross-sectional view of a known pivoting door-type thrust reverser.
Figure 2:
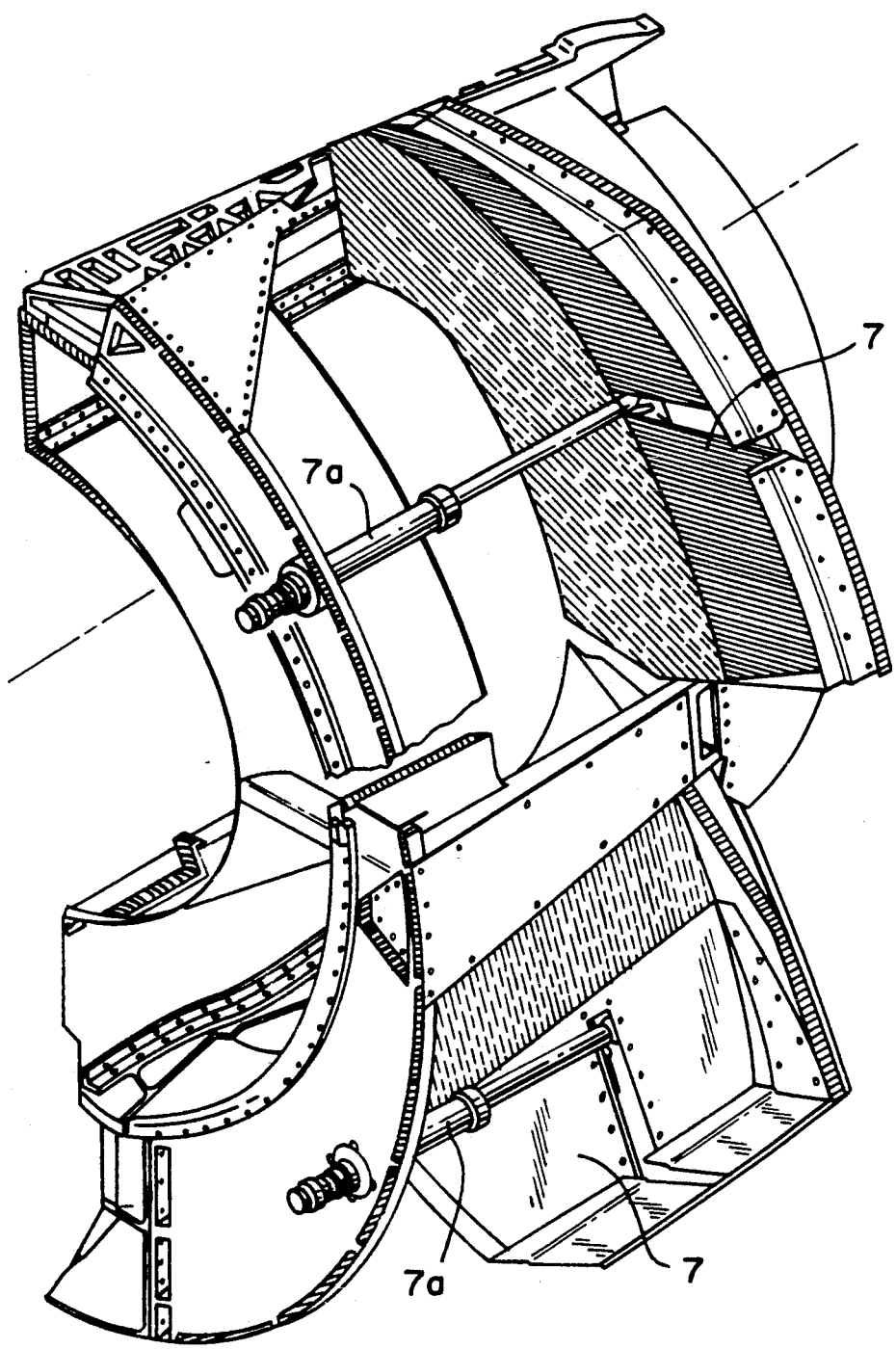
FIG. 2 is a partial, perspective view of a known type of pivoting door-type thrust reverser with the thrust reverser doors in their reverse thrust positions.

A turbofan engine thrust reverser according to the present invention to redirect the gases flowing through the cold flow air duct comprises an upstream stationary portion 1 which forms a part of the turbofan housing and which comprises exterior panel 4 and interior panel 5 interconnected by frame 6. The jack 7a which controls the movement of the thrust reverser doors is attached to frame 6. This structure is known, per se, and is similar to that of the known prior art illustrated in FIG. 1. The structure of the turbofan housing is somewhat different insofar as the thrust reverser according to the present invention does not utilize a stationary downstream collar 3, as in the prior art illustrated in FIG. 1.

According to the present invention, each thrust reverser door assembly 10 comprises an internal door 11 and an external door 12 each separately pivotally attached to the turbofan housing so as to pivot about axes 22 and 23, respectively. Axes 22 and 23 may extend generally parallel to each other and may also extend generally transversely across the turbofan housing. The interior surface 13 of internal door 11 is aligned with the interior panel 5 so as to provide aerodynamic continuity in the cold flow air duct thereby reducing disturbances of the gas flow to maximize the efficiency of the turbofan engine.

A seal 14 is located on an upstream edge of the internal door 11 such that effects a seal against a deflection edge 8 extending along an upstream side of the reverse thrust opening defined by the turbofan housing when the internal door 11 is in its forward thrust position. Seal 15 bears against stationary member 17 so as to seal the downstream edge of the internal door 11 against the stationary member 17. Stationary member 17 is connected to the stationary turbofan housing 1 by longitudinally extending connecting members (not shown).

Figure 3:
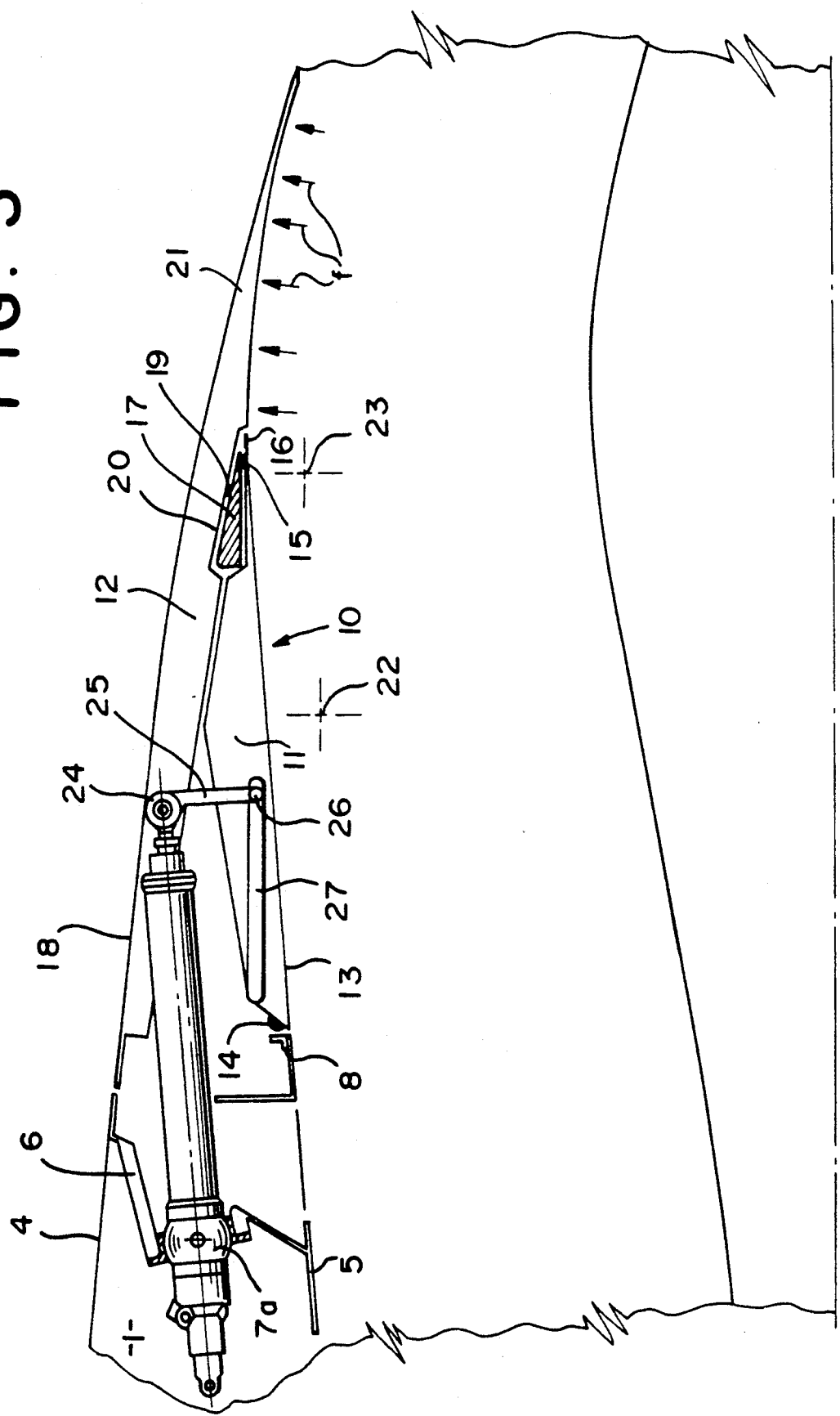
FIG. 3 is a partial, longitudinal, cross-sectional view of the thrust reverser according to the invention with the thrust reverser doors in their closed, forward thrust positions.

External door 12 has an exterior surface 18 which surface is substantially continuous with the outer surface of exterior panel 4 so as to provide a smooth aerodynamic surface on the outside of the turbofan engine housing. However, unlike the internal door 11, the upstream edge of the exterior door 12 is not sealed against the exterior panel 4. This allows the ambient air pressure to act on both sides of the upstream segment of the external door 12. Seal 19 is provided between an intermediate zone 20 of the external door 12 and the stationary member 17 to effect a seal between these elements, thereby preventing the entry of the pressurized air from the cold flow air duct from entering the space between the external door 12 and the internal door 11 and acting on the interior surface of the upstream segment of external door 12 when the thrust reverser is in the forward thrust mode, as illustrated in FIG. 3. Extending downstream of the stationary member 17, external door 12 has a downstream segment 21 whose inner surface is acted on by the pressurized gases flowing through the cold flow air duct. This downstream segment 21 also forms the downstream edge of the turbofan housing.

During the forward thrust operating mode, the pressure of the gases in the cold flow air duct, denoted by arrows f in FIG. 3, act on the external door 12 downstream of its pivot axes 23, thereby tending to move the door in a counterclockwise direction about this pivot axis, as viewed in FIG. 3. The forces generated by the pressurized gas act to bias the external door 12 to the closed, forward thrust position, even if the mechanical latching and locking mechanisms completely fail. Thus, the thrust reverser according to the present invention has thrust reversing doors which are "self-retracted" to prevent any danger of untimely opening.

Figure 4:
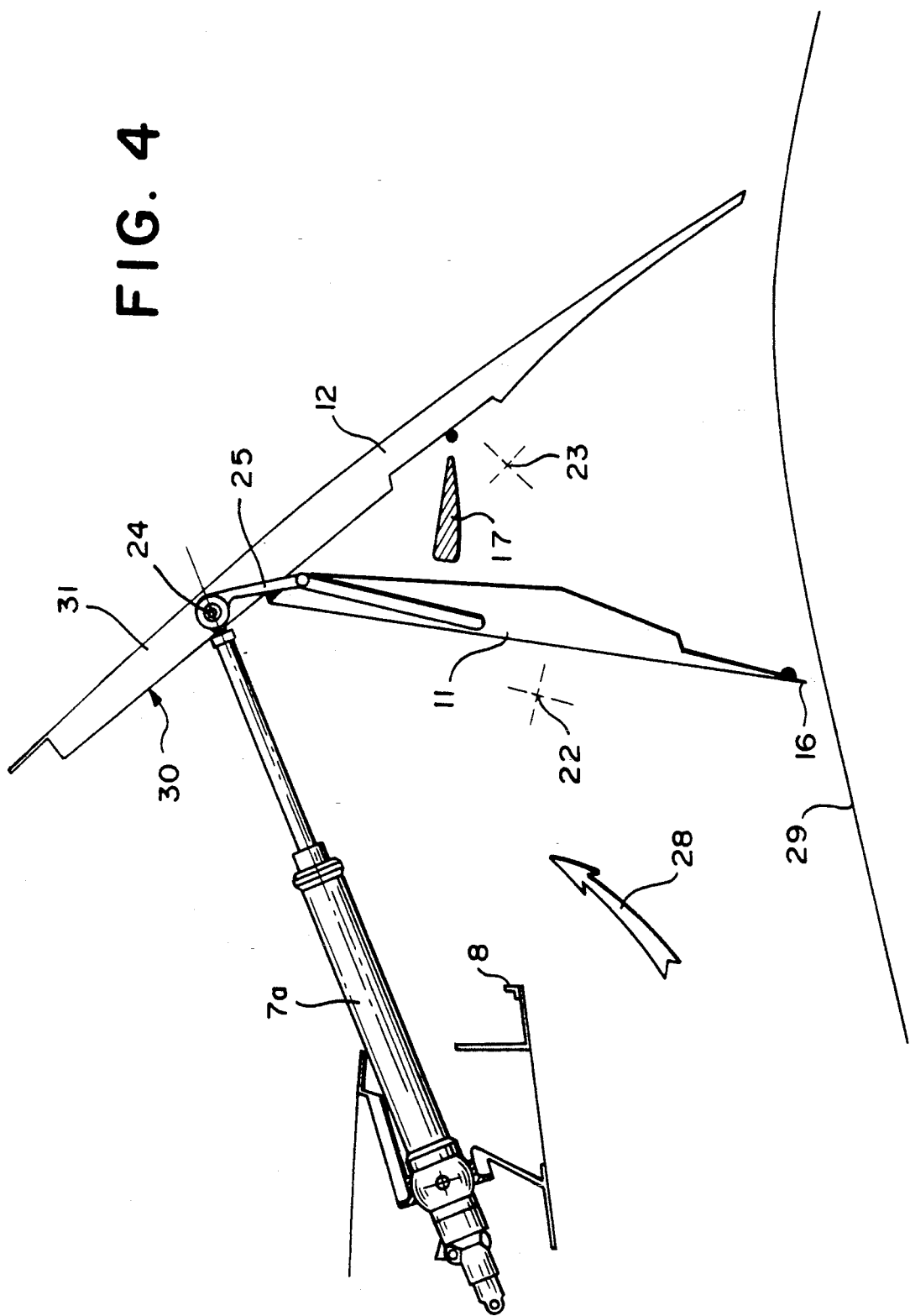
FIG. 4 is a partial, longitudinal, cross-sectional view similar to FIG. 3, showing the thrust reverser doors in their opened, reverse thrust positions.

The doors 11 and 12 are moved between their forward thrust and reverse thrust positions by hydraulic jack 7a, which has an extendible and retractable piston rod. The piston rod is connected to the external door 12 by pivot connection 24 such that extension of the piston rod causes the external door 12 to pivot about its axis 23 in a generally clockwise direction, as illustrated in FIGS. 3 and 4. The movement of the piston rod is transferred to the internal door 11 by a link rod 25 extending from the pivot connection 24 and having roller 26 attached thereto which slidably engages a slot 27 defined by the internal door 11.

As can be seen best in FIG. 4, extension of the piston rod causes both external door 12 and internal door 11 to pivot about their respective axes 23 and 22. The downstream edges of both doors thereby become adjacent to the external housing 29 of the turbojet engine to thereby block the cold flow air duct and redirect the air outwardly through the reverse thrust opening, as illustrated by arrow 28. A specific orientation and direction of the reverse flow gases can be achieved by contouring the interior surface 30 of the upstream segment 31 of external door 12. The specific orientation and direction imparted to the reverse thrust gases will vary depending upon the specific aircraft to which the engine is attached. The reverse thrust gases may be directed so as to avoid contact with aircraft control surfaces or the ground. As can be seen, the stationary member 17 is located between the internal and external doors 11 and 12.

The arrangement of the components in this invention offers the additional advantage of eliminating disturbances in the cold flow air duct caused by passageways formed in the thrust reverser doors to accommodate the piston rod of the jack 7a.

The foregoing is provided for illustrative purposes only and should not be construed as in any way limiting this invention, the scope of which is defined solely by the appended claims.

We claim:

1. A thrust reverser for a turbofan engine having a turbojet engine housing and a turbofan housing defining therebetween a secondary flow duct comprising:
   a) at least one reverse thrust opening defined by the turbofan housing, the reverse thrust opening having an upstream edge;
   b) at least one thrust reversing door assembly, each such door assembly comprising:
      i) an external door pivotally attached to the turbofan housing so as to pivot about a first pivot axis between a forward thrust position wherein the at least one reverse thrust opening is covered and a reverse thrust position in which the at least one reverse thrust opening is uncovered, the external door having an upstream segment located upstream of the first pivot axis, a downstream segment defining a downstream edge, located downstream of the first pivot axis and in communication with secondary flow duct such that pressurized gas flowing through the secondary flow duct contacts the downstream segment thereby urging the external door toward its forward thrust position, and an intermediate zone between the upstream and downstream segments; and, ii) an internal door pivotally attached to the turbofan housing so as to pivot about a second pivot axis between a forward thrust position and a reverse thrust position;

c) a stationary member extending generally transversely across the at least one reverse thrust opening and located between the upstream edge of the at least one reverse thrust opening and the downstream edge of the external door;

d) first seal means operatively associated with the internal door so as to effect a seal between the internal door and the upstream edge of the at least one reverse thrust opening, and between the internal door and the stationary member when the internal door is in its forward trust position so as to prevent the pressurized gas in the secondary flow duct from contacting the upstream segment of the external door;

e) second seal means operatively associated with the intermediate zone of the external door and the stationary member so as to effect a seal therebetween when the external door is in the forward thrust position; and, f) actuating means operatively associated with the external and internal doors so as to move the doors between their forward thrust and reverse thrust positions.

2. The thrust reverser of claim 1 wherein the first and second pivot axes extend generally parallel to each other.

3. The thrust reverser of claim 1 wherein the first and second pivot axes extend generally transversely to a longitudinal axis of the turbofan housing.

4. The thrust reverser of claim 1 wherein the upstream segment of the external door defines a surface to direct the gases passing through the at least one reverse thrust opening in a desired direction.

5. The thrust reverser of claim 1 wherein the stationary member is located between the internal and external doors.

6. The thrust reverser of claim 1 wherein the actuating means comprises:

a) an actuating cylinder having an extendible and retractable rod;
  b) first connecting means connecting the rod to the external door; and,
  c) second connecting means connecting the rod to the internal door.

7. The thrust reverser of claim 6 wherein the first connecting means comprises a pivot connection.

8. The thrust reverser of claim 7 wherein the second connecting means comprises:

a) a link rod extending from the pivot connection;
  b) a slot defined by the internal door; and,
  c) a roller member attached to the link rod and engaging the slot.

* * * * *